(12) United States Patent
Gillespie et al.

(10) Patent No.: US 8,631,139 B2
(45) Date of Patent: Jan. 14, 2014

(54) SYSTEM AND METHOD FOR AUTOMATICALLY INITIATING AND DYNAMICALLY ESTABLISHING SECURE INTERNET CONNECTIONS BETWEEN A FIRE-WALLED SERVER AND A FIRE-WALLED CLIENT

(75) Inventors: Brian Gillespie, Dublin (IE); Helmut Salmen, Los Gatos, CA (US); David Tracey, Drogheda (IE)

(73) Assignee: SIMtone Corporation

( * ) Notice: Subject to any disclaimer, the term of this patent is extended or adjusted under 35 U.S.C. 154(b) by 0 days.

(21) Appl. No.: 13/467,437

(22) Filed: May 9, 2012

(65) Prior Publication Data
US 2012/0222108 A1 Aug. 30, 2012

Related U.S. Application Data

(63) Continuation of application No. 12/840,356, filed on Jul. 21, 2010, now abandoned, which is a continuation of application No. 11/104,982, filed on Apr. 12, 2005, now abandoned.

(60) Provisional application No. 60/561,806, filed on Apr. 12, 2004.

(51) Int. Cl.
*G06F 15/16* (2006.01)
*G06F 15/173* (2006.01)

(52) U.S. Cl.
USPC ............................ 709/229; 709/225; 709/227

(58) Field of Classification Search
USPC ......................................................... 709/229
See application file for complete search history.

(56) References Cited

U.S. PATENT DOCUMENTS

| | | | |
|---|---|---|---|
| 6,104,716 A * | 8/2000 | Crichton et al. | 370/401 |
| 6,886,103 B1 * | 4/2005 | Brustoloni et al. | 726/15 |
| 2004/0034773 A1 * | 2/2004 | Balabine et al. | 713/168 |

* cited by examiner

*Primary Examiner* — Shripal Khajuria
(74) *Attorney, Agent, or Firm* — Wolf, Greenfield & Sacks, P.C.

(57) ABSTRACT

A system and method for automatically and dynamically initiating and establishing secure connections between a Server and a Client using a session control server (SCS). Both the Server and the Client are connected to an untrusted network (such as the Internet) through a Network Address Translator or Translation (NAT) router or a firewall. The SCS, independently trusted by both the Server and the Client, brokers the required connection parameters to establish a secure connection between the Server and the Client. The system and method does not require any user configuration on the Client and eliminates the need for the Server to accept explicit connection requests or packets from the Client, thereby allowing the Server firewall to always remain closed to all inbound traffic.

14 Claims, 4 Drawing Sheets

SYSTEM AND METHOD FOR AUTOMATICALLY INITIATING AND DYNAMICALLY ESTABLISHING SECURE INTERNET CONNECTIONS BETWEEN A FIRE-WALLED SERVER AND A FIRE-WALLED CLIENT

RELATED APPLICATION

This application claims the benefit under 35 U.S.C. §120 and is a continuation (CON) of U.S. application Ser. No. 12/840,356, entitled "SYSTEM AND METHOD FOR AUTOMATICALLY INITIATING AND DYNAMICALLY ESTABLISHING SECURE INTERNET CONNECTIONS BETWEEN A FIRE-WALLED SERVER AND A FIRE-WALLED CLIENT," filed on Jul. 21, 2010, which claims the benefit under 35 U.S.C. §120 and is a continuation (CON) of U.S. application Ser. No. 11/104,982, entitled "SYSTEM AND METHOD FOR AUTOMATICALLY INITIATING AND DYNAMICALLY ESTABLISHING SECURE INTERNET CONNECTIONS BETWEEN A FIRE-WALLED SERVER AND A FIRE-WALLED CLIENT," filed on Apr. 12, 2005, which claims priority under 35 U.S.C. §119(e) to U.S. Provisional patent application No. 60/561,806, entitled "INITIATING SECURE CONNECTIONS TO A HOST BEHIND A NAT OVER AN UNTRUSTED NETWORK USING A TRUSTED PARTY," filed on Apr. 12, 2004, each of which is incorporated herein by reference in its entirety.

FIELD OF THE INVENTION

The present invention relates to the field of computer networking and network security. More specifically it relates to a method automatically and dynamically initiating and establishing secure connections between a computer (i.e., Server) and a plurality of computers (i.e., clients), each of which is behind a Network Address Translator router and/or firewall.

BACKGROUND OF THE INVENTION

The Internet continues undergoing rapid expansion in the numbers of connected computers and it is estimated that the trend towards widely available wireless connectivity and portable computing devices will increase exponentially the number of new computers that connect each day. This rapid expansion has increased radically the need for protecting computers from unauthorized access and has already started causing a number of scalability problems for the Internet network itself. For example the Internet Protocol Version 4 (IPv4) uses 32-bit IP (Internet Protocol) addresses, which means that the theoretical maximum number of computers on the Internet is about 4 billion. The practical limit however, is much lower, due to inefficiencies in how IP addresses are allocated and routed. As such, IPv4 does not provide sufficient unique addresses for the current expansion of the Internet. A newer version of the Internet Protocol (IPv6) uses a 128 bit address space and so provides a larger number of IP addresses, but until this has achieved widespread adoption, other techniques have been used to overcome the address limitations of IPv4 and provide security protection to Internet connected computers.

One such solution in wide use today is Network Address Translation (NAT), where private addresses used on internal networks, such as AOL or other Internet Service Providers (ISP), are only converted to public IP addresses when the subscriber's computer needs to reach out and connect to a public Internet server, such as a Web Server for example. Given that the number of computers that communicate over the Internet at any one time is much lower than the total number of computers that are connected but inactive, only those currently communicating are assigned a public IP address by NAT, thereby reducing the required number of IP addresses. This also provides additional security by virtue of the anonymity afforded to the computers behind NAT-routers or firewalls, which cannot be reached through connections initiated from the Internet.

NAT routers were designed primarily around the client/server paradigm, where client machines inside a private network initiate connections to public servers with stable IP addresses and domain name service or server (DNS) names.

The anonymity and inaccessibility of the internal hosts behind a NAT router is not a problem for client software such as web browsers, which only need to initiate outgoing connections to publicly available Servers. However, this is a problem for applications that require Servers to securely connect to Clients, through incoming connections going through their NAT routers, such as file sharing, games applications, video conferencing, voice-over-IP internet telephony or for secure access to computer servers that do not allow clients to directly connect to them from the internet.

When one of these computers is behind a NAT router, then the other computer cannot connect to it, without the use of special techniques and often complex manual configuration required for every change in connection type, location, service or NAT router/firewall type.

Therefore the asymmetric nature of the addressing and connectivity established by NAT does create a number of problems that a) limit the security of widely available internet services to outbound-only applications, such as the World Wide Web, and b) limit the usability and mass market availability of many additional internet applications and services potentially attractive to large consumer markets, to a smaller number of professionally trained users capable of managing the complex configuration and system management requirements imposed by the currently available NAT and NAT-transverse technology.

SUMMARY OF THE INVENTION

Therefore, it is an object of the present invention to provide a method and system for automatically initiating and dynamically establishing Internet connections between a server and a client which overcomes the above-noted shortcomings.

In accordance with an embodiment of the present invention, the method and system automatically and dynamically initiates and establishes connections, preferably secured connections, between a server and a fire-walled client device (Client), both connected to an untrusted network (such as the Internet) through a Network Address Translator or Translation (NAT) router or a firewall. The secure connections of present invention are initiated and established without requiring any user configuration on the Client and without accepting any explicit connection request and/or packets from the Client by the Server, thereby advantageously allowing the Server firewall to always remain closed to all inbound traffic.

The present invention enables the creation of dynamically instantiated virtual point to point network connections over the Internet to securely connect Servers and Clients on demand, thereby advantageously providing the common user with one single action access (such as one mouse-click, or power-on or network plug-in action) to the Servers with unprecedented ease to use.

In accordance with an embodiment of the present invention, the system and method as aforementioned utilizes a third Computer, e.g., a trusted party such as a session control server ("SCS"), with a public IP address, independently trusted by both Server and Client, to securely broker the connection parameters required to establish a connection between Server and the Client, preferably a secure connection. The SCS only participates in the Server/Client connection setup and plays no part in the subsequent communications (i.e., exchange of messages) between the Server and the Client. Accordingly, the present invention avoids the performance and security problems associated with the relay and other server based techniques discussed herein.

The Client sends a connection request containing its own address and a randomly generated unique identifier (different for each Client connection request to each Server) to the SCS, thus providing the SCS with the Client's connection parameters otherwise hidden by the NAT router and/or by the firewall. The Client can be programmed to always perform this step automatically at power-on, upon connection to any new NAT-ted network, upon any change of its network parameters, thus providing for automatic and dynamic initiation/establishment and re-establishment of the secure connection with the Server without any user configuration or intervention.

The SCS then provides each of the Client and the Server with the respective connection parameters, which are then exchanged securely between them so that first the Client's connection parameters are delivered and uniquely identified to the Server and finally, upon successful completion of the preceding step, the Server initiates the secure connection to the Client through the Client's NAT router or firewall, thus enabling an externally initiated connection to be made by securely overcoming the inbound traffic restrictions imposed by the Client NAT router or firewall and allowing the Server to maintain its own NAT router/firewall closed to all inbound traffic coming from the untrusted network.

In accordance with an embodiment of the present invention, a system for automatically initiating and dynamically establishing secure connections over an untrusted network comprises a client device connected to the untrusted network via a firewall or network address translator (NAT) router, a Server connected to the untrusted network via a firewall and which does not accept explicit connection requests or packets from any client device, and a trusted computer connected to the untrusted network for exchanging connection parameters between the server and the client device without configuring the client device. The client device receives a unique connection identifier from the Server via the trusted computer. The Server's firewall receives an unsolicited packet comprising the unique connection identifier from the client device to dynamically establish a transient mapping between the client device and the Server. If the unique connection identifier in the unsolicited packet received from the client device matches a stored unique connection identifier, the Server transmits a response packet to the client device using the dynamically established transient mapping over the untrusted network, thereby establishing a secure connection between the Server and the client device through the NAT router.

In order to appreciate the current invention, one must understand that even with all the advances in computer security, the Internet remains an inherently insecure environment because it is difficult to reconcile "ease of use" issues with trusted access elements. This invention strikes at the heart of this problem by supplying a methodical approach that eliminates the possibility that fraudulent users can masquerade as legitimate ones, while at the same time, it does not add, in fact it eliminates, many elements that common users would find burdensome.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the specific concepts and embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The invention may be understood by reference to its description herein, given by way of example and not intended to limit the present invention solely thereto, will be best understood in conjunction with accompanying drawings in which.

DETAILED DESCRIPTION OF THE INVENTION

Figure 1:
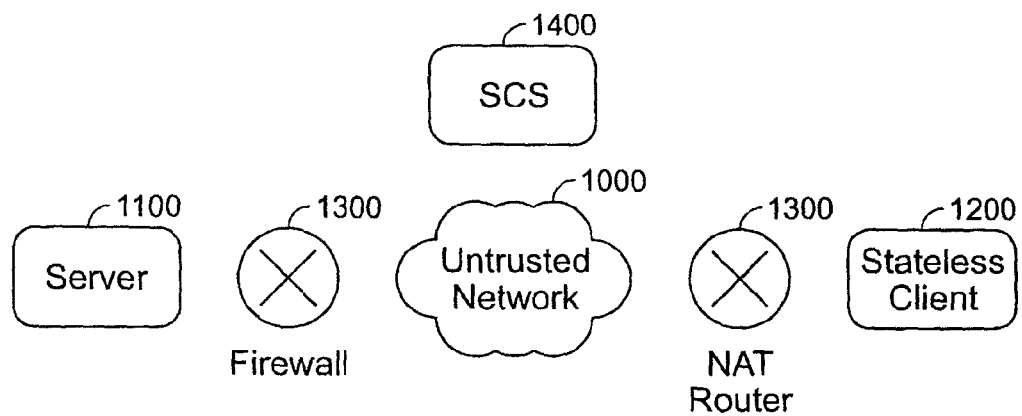
FIG. 1 is an exemplary block diagram showing various computers connected to an untrusted network behind a NAT or a firewall.

In accordance with an embodiment of the present invention, the system and method automatically and dynamically initiates and establishes connections, preferably secure connections, between a server and a fire-walled client device. Turning now to FIG. 1, there is illustrated a Server 1100 and a client device (Client 1200), both connected to an untrusted network 1000 (such as the Internet) through a Network Address Translator or Translation (NAT) router or a firewall 1300. The connections between the Server and the Client are initiated and established without requiring any user configuration on the Client 1200 and without accepting any explicit connection request and/or packets from the Client 1200 by the Server 1100, thereby allowing the Server firewall 1300 to always remain closed to all inbound traffic.

In accordance with an embodiment, the present invention utilizes a third computer 1400, e.g., a trusted party such as a session control server ("SCS"), with a public IP address independently trusted and securely connected to both the Server 1100 and the Client 1200. The Client 1200 sends a connection request comprising its own address and a randomly generated unique identifier (different for each Client connection request to a Server) to the SCS 1400, thereby providing the SCS 1400 with the Client's connection parameters otherwise hidden by the NAT router 1300 and/or by the firewall 1300. In accordance with an aspect of the present invention, the Client 1200 can be programmed to always perform this step automatically at power-on, upon connection to any new NAT-ted network, upon any change of its network parameters, thus providing for automatic and dynamic initiation/establishment and re-establishment of the secure connection with the Server 1100 without any user configuration or intervention.

The SCS 1400 provides each of the Client 1200 and the Server 1100 with the respective connection parameters, which are then exchanged securely between them so that first the Client's connection parameters are delivered and uniquely identified to the Server 1100 and finally, upon successful completion of the preceding step, the Server 1100 initiates the secure connection to the Client 1200 through the Client's NAT router or firewall 1300, thus enabling an externally initiated connection to be made by securely overcoming the inbound traffic restrictions imposed by the Client NAT router or firewall 1300 and allowing the Server 1100 to maintain its own NAT router/firewall 1300 closed to all inbound traffic coming from the untrusted network.

The SCS only participates in the Server/Client connection setup and plays no part in the subsequent communications (i.e., exchange of messages) between the Server and the Client. Accordingly, the present invention avoids the performance and security problems associated with the relay and other server based techniques.

The Relaying technique is a variation of client-server communication and relies on the two Clients using a Server with a public IP address that they can both connect to. The two Clients behind NAT routers cannot make a direct connection to each other, but each make a connection to the Server with the public IP address. The Server then acts as a relay and it forwards messages from one Client to another. This method has the disadvantage that by relying on the Server to relay all communications between the Clients, it needs to use the Server's available processing power and available network bandwidth to connect the Clients, hence its performance and scalability depend on these parameters. Moreover a copy of the inter-Client data communications is constantly made on the Server, thereby creating an additional security threat.

The UDP hole punching technique is based on the general behavior of firewalls that allow applications to "punch holes" through the NAT router and establish direct connectivity with one another.

In accordance with an exemplary embodiment of the present invention, the following describes the system, method and computer instructions for automatically initiating and establishing a secure connection between the Server 1100 and a Client 1200 behind a NAT router or firewall 1300 over an untrusted network 1000. It is appreciated that all of the interactions described herein occur over an untrusted network 1100, such as the Internet. It is also appreciated that all interactions described herein can occur over non-secure connections. The automatic and dynamic client side connectivity to the Server 1100 in accordance with an exemplary embodiment of the present invention is now described in conjunction with FIGS. 2-8.

Figure 2:
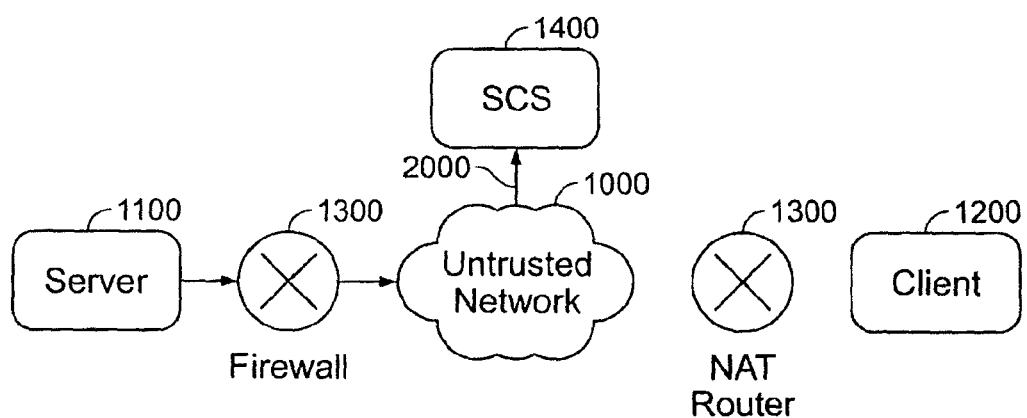
FIGS. 2-8 are exemplary block diagrams showing the steps of automatically initiating and dynamically establishing connections between a Server and a Client, each behind a firewall or NAT router, in accordance with an embodiment of the present invention.

As illustrated in FIG. 2, the Server 1100 initiates and establishes (or maintains permanently) a secure connection to the SCS 1400 in step 2000. In accordance with an aspect of the present invention, this connection can be made over the network work layer (OSI layer 3) such as with IPSEC. In accordance with another aspect of the present invention, the secure connection can use an application layer (OSI layer 7) mechanism such as with secure sockets layer (SSL). All subsequent communications between the Server 1100 and the SCS 1400 can be conducted over this secure communications channel.

Figure 3:
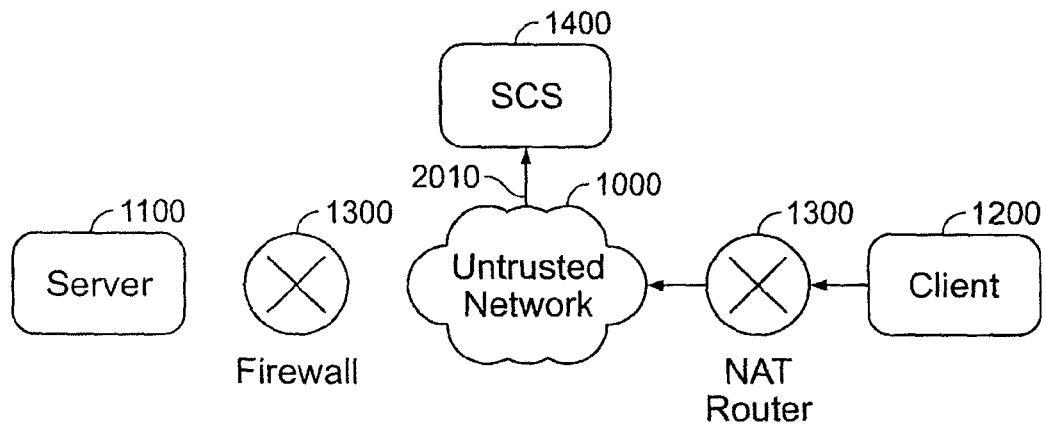

As depicted in FIG. 3, the Client 1200 initiates a secure connection with the SCS 1400 in step 2010. In accordance with an aspect of the present invention, the secure connection can use an application layer (OSI layer 7) mechanism such as with secure sockets layer (SSL). All subsequent communications between the Client 1200 and the SCS 1400 can be conducted over this secure communications channel.

Figure 4:
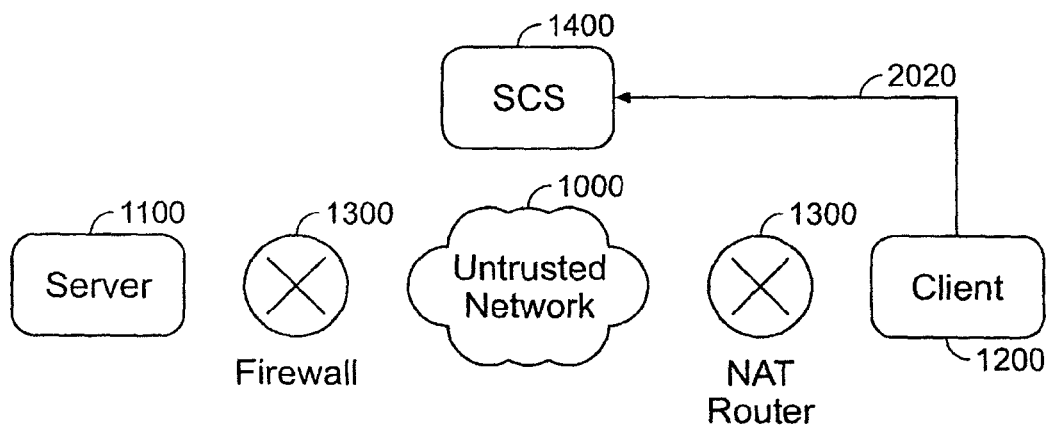

The Client 1200 sends a request to the SCS 1400 to be connected to the desired Server 1100 in step 2020, as shown in FIG. 4. This can be a result of a Client initiated event such as a user request or the Client 1200 can be programmed to always perform this step automatically at power-on, upon connection to any new NAT-ted network, upon any change of its network parameters, thereby providing for automatic and dynamic initiation/establishment and re-establishment of the secure connection with the Server 1100 without any user configuration or intervention.

Figure 5:
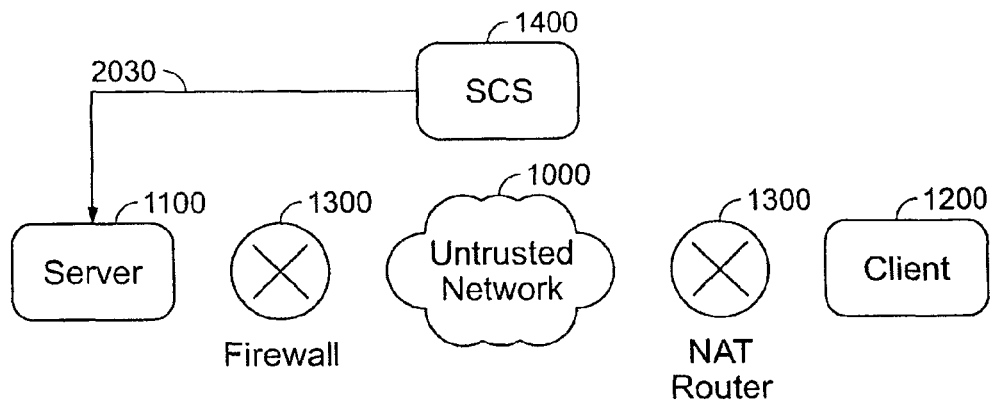

The SCS 1400 sends a unique tag to the Server consisting of a specific destination inbound port, the client NAT's public address in step 2030 and receives from the Server 1400 a randomly generated connection identifier (ID). It is appreciated that in accordance with an embodiment of the present invention, the destination inbound port provided by the Server 1100 remains closed throughout the initiation, establishment and use of the secure connection with the Client 1200. Using this SCS provided information, as illustrated in FIG. 5, the Server 1100 configures its own end of the connection that will be likely made to Client 1200 by the Server 1100. The nature of this configuration is dependent of the nature of the secure connection that will be made but will generally involve some key generation and exchange. For example, in accordance with an aspect of the present invention, the secure connection can be made over the network work layer (OSI layer 3) such as with IPSEC. In accordance with another aspect of the present invention, the secure connection can use an application layer (OSI layer 7) mechanism such as with secure sockets layer (SSL).

Figure 6:
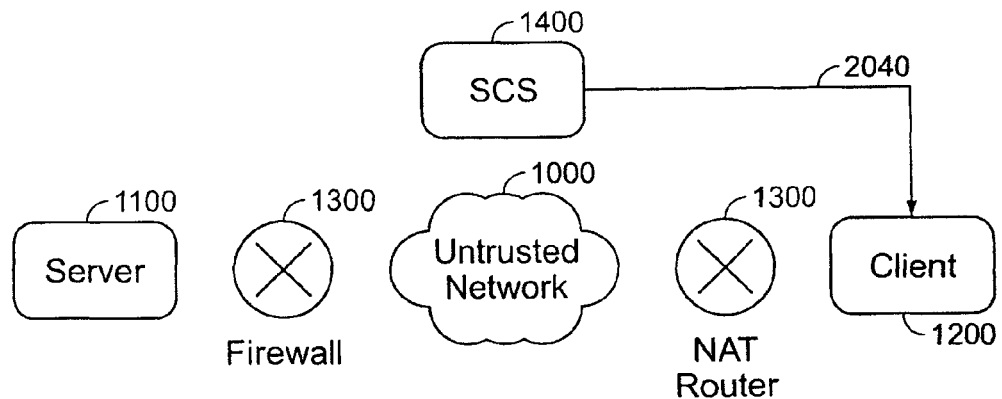

The SCS 1400 instructs the Client 1200 to send a unsolicited UDP or TCP packet containing the ID to a Server-provided IP address and destination port in step 2040, as shown in FIG. 6. The SCS 1400 configures the Client end of the secure connection that will be likely made to the Client 1200 by the Server 1100. Also for the Client side, the nature of this configuration is dependent of the nature of the secure connection that will be made but will generally involve some key generation and exchange. For example, in accordance with an aspect of the present invention, the secure connection can use an application layer (OSI layer 7) mechanism such as with secure sockets layer (SSL).

The Client 1200 sends a UDP or TCP packet to the Server IP address and destination port provided by SCS 1400 in step 2050. It is appreciated that the Server 1100 and the Server's firewall 1300 still remain closed to the Client 1200. This establishes a transient mapping in the client NAT router 1300 between the Client 1200 and the Server 1100 in step 2050. This mapping consists of a translation between the Client's real IP address and source port (private side) and the NAT masqueraded client IP address and source port (public side). This mapping will remain in effect for a small period of time after it is made, thus allowing the Server 1100 to connect through to the Client 1200 at that mapping within a specific time-frame of the mapping having been created.

Figure 7:
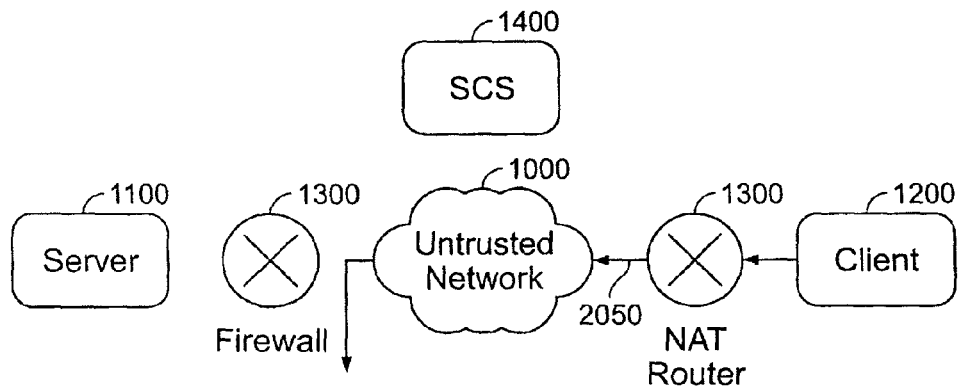
Figure 8:
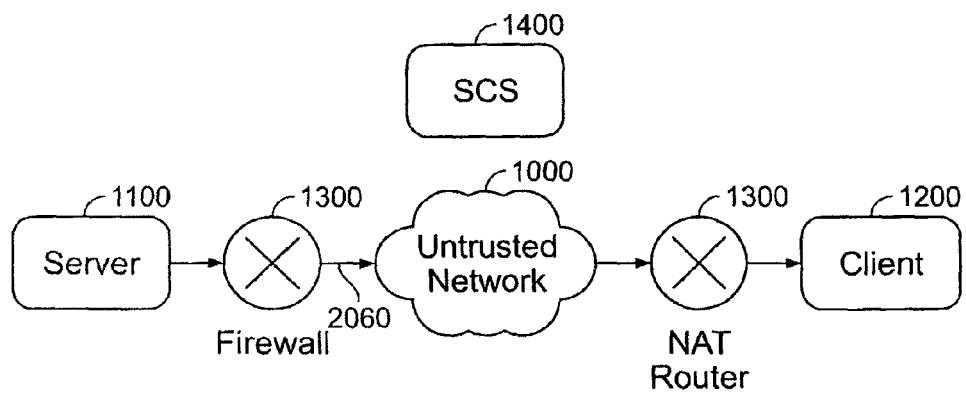

The Server's firewall 1300 sees the UDP or TCP packet, compares the ID and NAT public address in it to those it received from the SCS 1400 in step 2050. If there is a match then the Server's firewall 1300 notifies the Server 1100 about the event. The Server's firewall 1300 then always drops the unsolicited packet in step 2050, i.e., the packet never enters up into the Server's IP stack, as depicted in FIG. 7. The Server's firewall 1300 continues to check incoming packets on specified destination ports to see if they are query packets. In accordance with an embodiment of the present invention, the Server's firewall 1300 checks all three elements of the tag to guard against security attacks such as connection requests by a host masquerading as a genuine Client 1200. The Server's firewall 1300 will only consider packets coming from the NAT public address, to the specified destination port and containing the randomly generated ID. As a further guarantee of security the UDP/TCP packet could be encrypted as part of this technique.

The Server 1100 initiates a UDP or TCP connection to the Client 1200 using the source port forwarded by the Server's firewall 1300 in step 2060. It is appreciated that the NAT mapping created in step 2050 holds for a reasonable period of time (at least several seconds but possibly longer after the UDP or TCP packet has been received). In accordance with an aspect of the present invention, the Server 1100 can connect to the client through the NAT in this manner in step 2060, see FIG. 8.

One skilled in the art would appreciate that the Client 1200 is automatically connected and dynamically reconnected to the Server 1100 upon a change in its network address parameters, such as when the Client 1200 is moved to a different connection location, without requiring any user intervention other than one single user action such as a power-on, one mouse click or one keystroke. As a result, it is appreciated that the Client 1200 is not required be aware of any user information, or to process or perform any user function to be connected to the Server 1100 by means of an embodiment of this invention.

By means of example, in accordance with an embodiment of the present invention, one would appreciate the applicability of the invention to establishing secure connections between a Server 1100 and a Stateless Client 1200 over the internet via TCP/SSL. A Stateless Client 1200 is generally defined as a computer that does not perform any user functionality or contain any user data. More precisely a Stateless Client 1200 can be built as a network appliance consisting of a CPU, memory, Framebuffer and network port, mouse and keyboard input and optional IO ports. It's operated by built-in software that only performs network and display management fixed functions and does not allow for any download or execution of other software. It does not run any application. Its only purpose is to be a remote human interface device. The built-in software implements a network stack to allow communications with a server over a network like the Internet.

The statelessness of the client is in the context of the human interacting with applications or computational environments where all execution is on the server side. There is no application state or data residing in the client at any time. The only state it has is of temporary nature and related to network connectivity, i.e., TCP connection state. In accordance with an embodiment, present invention only uses the Stateless Client's network stack implementing the Secure Socket Layer (SSL) over TCP, as described in detail herein, and henceforth enables the automatic and dynamic establishment of secure connections between the Servers 1100 and Stateless Clients 1200 which cannot perform any user functions under any circumstance.

The Stateless Client 1200 automatically connects via TCP/SSL to the SCS 1400 and sends the name of the requested Server 1100 over the newly established connection.

The SCS 1400 detects the Stateless Client IP address from the socket connection. The SCS 1400 reads the requested Server name and determines if it has a connection to the desired Server 1100. If the SCS 1400 has no such connection the desired Server 1100, then the SCS 1400 either waits until it gets such connection or instructs the Stateless Client 1200 to retry later. If the Server 1100 is connected to the SCS 1400, then the SCS 1400 sends the Stateless Client IP address to the Server 1100. The Server 1100 reads the Stateless Client address, generates a unique 32 bit random number identifier (the ID) and sends the ID along with its IP address and port to the SCS 1400. The Server 1100 then instructs its firewall 1300 to sniff for "TCP SYN" (TCP connection request) packets from the Stateless Client's public IP address that have a initial sequence number set to the value of the ID.

Meanwhile the SCS 1400 forwards the server IP address, port and ID to the Stateless Client 1200. At this point the Stateless Client 1200 generates unsolicited TCP connection requests to the Server IP address and port with an initial sequence number set to the value of the ID. This outgoing packet will prime any NAT on the way to the Server 1100 and also deposit servers IP address and port as well as the ID in a SEQ translator layer at the bottom of the Stateless Client's network stack. Once such packet arrives at the Server 1100, the Server's firewall 1300 looks for a match and performs the following three tasks: a) store the Stateless Client address/port, server address/port and the sequence number; b) notify the Server 1100 and provide the Stateless Clients public port; and c) drop the packet.

The Server 1100 now opens a TCP connection to the Stateless Clients IP/port that will transverse the Server firewall 1300. The Server's firewall 1300 sees the outgoing TCP connection request (SYN flag is set) and finds a match and sets the TCP ACK flag and the acknowledge number. Externally, it is appreciated that the packet looks like a response to the unsolicited TCP connection request received from the Stateless Client 1200 and it travels back through the NAT gateways back to the Stateless Client 1200.

Upon arrival of such packet at the Stateless Client 1200, the SEQ translator layer matches the packet and deletes the TCP ACK flag such that the Stateless Client TCP stack sees a real connection request from the Server 1100.

The Stateless Clients TCP stack accepts the connection and responds with a TCP packet that has both the SYN and the ACK flag set. This TCP packet is matched by the SEQ translator layer which deletes the SYN flag and stores the difference between Stateless Client sequence number and the previously stored ID. It is appreciated that on the network this TCP packet looks like a third part of the TCP 3-way handshake.

When the TCP packet from the Stateless Client 1200 arrives at the Server's firewall 1300, the TCP packet is matched and the SYN flag is set. This TCP packet passes through the Server's firewall 1300 since it is a response to a connection request. The real third TCP handshake packet that comes from the Server 1100 passes through without change since it is treated as a normal acknowledgement packet. At the Stateless Client 1200, every arriving packet gets its acknowledge number adjusted by the previously stored sequence difference and every outgoing packet gets its sequence number adjusted by the difference. It is appreciated that no special flag mangling is necessary on the termination of the connection between the Server 110 and the Stateless Client 1200.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A method for establishing secure connections over a network between a client and a server connected to the network which does not accept explicit connection requests or packets from any client, using a third party computer trusted by both said server and said client, said server being connected to said network via a firewall configured to deny at least some requests to connect to the server initiated from outside the firewall or network address translator (NAT) router, the method comprising the steps of:
    receiving, by the third party computer, a connection request from said client to be connected to said server: the connection request comprising at least one connection parameter including a network address for said client;
    transmitting to said client, by said third party computer, a connection identifier known by said server and a server network address associated with the server;
    transmitting to said server, by said third party computer, the at least one connection parameter, wherein a network communication is transmitted by the client to the server network address, the network communication including the connection identifier, the network communication received and verified by the firewall including a verification of the connection identifier, and wherein the server initiates a network connection between the server and the client upon successful verification of the network communication such that subsequent network communications between the server and the client are transmitted over the network connection and not through the third party computer.

2. The method of claim 1, wherein said client is connected to the network via a network address translation (NAT) router, and wherein said server receives a destination inbound port of said client and a public address of said NAT router associated with said client from said third party computer, and transmits a destination port of said server and IP address of said firewall associated with said server and said connection identifier for said client to said third party computer.

3. The method of claim 2, wherein said client receives an instruction to send an unsolicited packet to said server using said destination port of said server and said IP address of said firewall associated with said server from said third party computer, and said server transmits a response packet to said client if it is determined that said unsolicited packet is received on said destination port of said server from said public address of said NAT router associated with said client.

4. The method of claim 2, wherein said server initiates said secure connection to said client using said destination inbound port of said client received from said third party computer.

5. The method of claim 1, wherein said firewall associated with said server receives an unsolicited UDP or TCP packet comprising said connection identifier from said client.

6. The method of claim 1, wherein said connection request to received by said third party computer is automatically transmitted by said client upon one single action by a user of said client at power-on, upon connection to an untrusted network and/or upon any change in said client's network parameter, thereby providing said user of said client with one single action access to said server.

7. An apparatus for assisting in system for automatically initiating establishing secure connections over a network in a system having a server connected to the network, a first firewall associated with the server and configured to deny at least some requests to connect to the server initiated from outside the first firewall, and a client device connected to the network, the apparatus comprising:
    a third party computer trusted by both said server and said client, the third party computer configured to assist in establishing a network connection between the client and the server, the third party computer configured to, upon receipt of a connection request from the client to connect to the server, the connection request including at least one connection parameter comprising a network address of the client, transmit a connection identifier known to the server and a server network address associated with the server to the client, and transmit the at least one connection parameter to the server, wherein said client is configured to, upon receipt of the connection identifier, transmit a network communication to the server network address, the network communication including the connection identifier, and wherein said first firewall is configured to, upon receipt of the network communication, verify the connection identifier, and wherein said server, upon verification of the connection identifier, is configured to initiate a network connection between said server and said client, wherein subsequent network communications between said server and said client are transmitted over the network connection and not through the third party computer.

8. The system of claim 7, wherein said client is connected to the network via a network address translation (NAT) router, and wherein said server is operable to receive a destination inbound port of said client and a public address of said NAT router associated with said client from said third party computer; and wherein said client is operable to receive a destination port and IP address of said server and said connection identifier from said third party computer.

9. The system of claim 8, wherein said client is operable to receive an instruction to send an unsolicited packet to said server from said third party computer, and wherein said server is operable to transmit a response packet to said client if it is determined that said unsolicited packet is received on said destination port of said sever from said public address of said NAT router associated with said client.

10. The system of claim 7, wherein said server is operable to initiate said secure connection to said client using said destination inbound port of said client received from said third party computer.

11. The system of claim 7, wherein said client is a stateless client.

12. The system of claim 7, wherein said client is a network-aware consumer device.

13. The system of claim 12, wherein said network-aware consumer device is one of the following: a cellular phone, a music player/recorder, a video player/recorder, a game player, or a portable email device.

14. The system of claim 7, wherein said client is operable to automatically transmit said connection request upon one single action by a user of said client at power-on, upon connection to an untrusted network or upon any change in said client's network parameter to said third party computer, thereby providing said user of said client with one single action access to said server.

* * * * *

UNITED STATES PATENT AND TRADEMARK OFFICE
CERTIFICATE OF CORRECTION

PATENT NO. : 8,631,139 B2  
APPLICATION NO. : 13/467437  
DATED : January 14, 2014  
INVENTOR(S) : Brian Gillespie et al.

Page 1 of 1

It is certified that error appears in the above-identified patent and that said Letters Patent is hereby corrected as shown below:

In the Claims

At column 9, claim 1, lines 17-18, please delete "which does not accept explicit connection requests or packets from any client,";

At column 9, claim 1, lines 22-23, please delete "or network address translator (NAT) router"; and At column 10, claim 7, lines 8-9, please delete "system for automatically initiating".

Signed and Sealed this  
Third Day of June, 2014

Michelle K. Lee  
*Deputy Director of the United States Patent and Trademark Office*